United States Patent
Takami et al.

(10) Patent No.: US 10,917,609 B2
(45) Date of Patent: Feb. 9, 2021

(54) INTERPOLATION FRAME GENERATION DEVICE

(71) Applicant: JVCKENWOOD Corporation, Yokohama (JP)

(72) Inventors: Maki Takami, Yokohama (JP); Atsushi Yoshida, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 0 days.

(21) Appl. No.: 16/808,942

(22) Filed: Mar. 4, 2020

(65) Prior Publication Data
US 2020/0204760 A1    Jun. 25, 2020

Related U.S. Application Data

(63) Continuation of application No. PCT/JP2018/010787, filed on Mar. 19, 2018.

(30) Foreign Application Priority Data

Sep. 22, 2017 (JP) ................. 2017-182002

(51) Int. Cl.
H04N 7/01 (2006.01)

(52) U.S. Cl.
CPC ........... H04N 7/014 (2013.01); H04N 7/0127 (2013.01)

(58) Field of Classification Search
CPC .... H04N 7/014; H04N 7/0127; H04N 7/0137; H04N 7/0142; H04N 7/0135; H04N 7/0145; H04N 7/01; H04N 7/0157

USPC ....... 348/441, 448, 451, 452, 458, 459, 619, 348/620
See application file for complete search history.

(56) References Cited

U.S. PATENT DOCUMENTS

| 2005/0007491 A1* | 1/2005 | Ishii ....................... H04N 7/012 |
| | | 348/452 |
| 2013/0051470 A1* | 2/2013 | Noguchi .............. H04N 19/521 |
| | | 375/240.14 |

FOREIGN PATENT DOCUMENTS

JP    2014-187690 A    10/2014

* cited by examiner

*Primary Examiner* — Sherrie Hsia
(74) *Attorney, Agent, or Firm* — Nath, Goldberg & Meyer; Jerald L. Meyer

(57) ABSTRACT

A motion vector detector detects a motion vector, and generates reliability data of the motion vector. Pixel selectors select pixels for dynamic interpolation and pixels for static interpolation. The mixing ratio generator generates a first mixing ratio of interpolation pixels of the dynamic interpolation and interpolation pixels of the static interpolation based on the reliability data. A mixing ratio generator generates a second mixing ratio based on a difference value between the pixels for the dynamic interpolation. A mixing ratio adjuster adjusts the mixing ratio so that the mixing ratio of the interpolation pixels of the static interpolation becomes larger to generate a third mixing ratio. An interpolation data generator mixes the interpolation pixels of the dynamic interpolation and the static interpolation with each other in response to the third mixing ratio.

3 Claims, 4 Drawing Sheets

INTERPOLATION FRAME GENERATION DEVICE

CROSS REFERENCE TO RELATED APPLICATION

This application is a Continuation of PCT Application No. PCT/JP2018/010787, filed on Mar. 19, 2018, and claims the priority of Japanese Patent Application No. 2017-182002, filed on Sep. 22, 2017, the entire contents of both of which are incorporated herein by reference.

BACKGROUND

The present disclosure relates to an interpolation frame generation device that generates an interpolation frame based on a motion vector of an image.

In order to covert a frame frequency of a video signal, an interpolation frame generation device generates an interpolation frame to be interpolated between two frames adjacent to each other. Based on a motion vector of an image, the interpolation frame generation device generates respective interpolation pixels which configure the interpolation frame.

SUMMARY

When the motion vector is erroneously detected, inappropriate interpolation pixels are generated, and a viewer is given a feeling of visual discomfort. Accordingly, in order to reduce the feeling of visual discomfort, interpolation pixels of dynamic interpolation, which are generated based on a motion vector, and interpolation pixels of static interpolation with zero motion are sometimes mixed with each other to generate interpolation pixels.

If a ratio of the interpolation pixels of the dynamic interpolation is increased when the interpolation pixels of the dynamic interpolation and the interpolation pixels of the static interpolation are mixed with each other, then, a motion of an image in the interpolation frame is smoothed; however, the feeling of visual discomfort when the motion vector is erroneously detected is likely to be increased. Meanwhile, if a ratio of the interpolation pixels of the static interpolation is increased, then, the feeling of visual discomfort can be reduced even when the motion vector is erroneously detected; however, smoothness of the motion of the image is sometimes lost more than necessary.

An aspect of one or more embodiments provides an interpolation frame generation device including: a motion vector detector configured to detect a motion vector of an image based on pixels in at least first and second frames in an input video signal, and to generate reliability data indicating reliability of the motion vector; a pixel selector configured to select a pair of pixels for dynamic interpolation based on the motion vector and a pair of pixels for static interpolation from the pixels in the first and second frames in order to generate respective interpolation pixels which configure an interpolation frame to be interpolated between the first and second frames; a first mixing ratio generator configured, based on the reliability data, to generate a first mixing ratio indicating a mixing ratio of the interpolation pixels of the dynamic interpolation, the interpolation pixels being generated based on the pair of pixels for the dynamic interpolation, and the interpolation pixels of the static interpolation, the interpolation pixels being generated based on the pair of pixels for the static interpolation; a second mixing ratio generator configured to generate a second mixing ratio indicating a mixing ratio of the interpolation pixels of the dynamic interpolation and the interpolation pixels of the static interpolation based on a difference value between the pair of pixels for the dynamic interpolation, the pixels being selected by the pixel selector; a mixing ratio adjuster configured, when the first mixing ratio and the second mixing ratio are different from each other, to generate a third mixing ratio by adjusting the first mixing ratio and the second mixing ratio so that the mixing ratio of the interpolation pixels of the static interpolation becomes larger than when a mixing ratio in which the mixing ratio of the interpolation pixels of the static interpolation is smaller is selected from between the first mixing ratio and the second mixing ratio; and an interpolation data generator configured to generate the interpolation pixels of the dynamic interpolation and the interpolation pixels of the static interpolation, and to mix the interpolation pixels of the dynamic interpolation and the interpolation pixels of the static interpolation adaptively with each other in response to the third mixing ratio to generate interpolation pixels.

DETAILED DESCRIPTION

Figure 1:
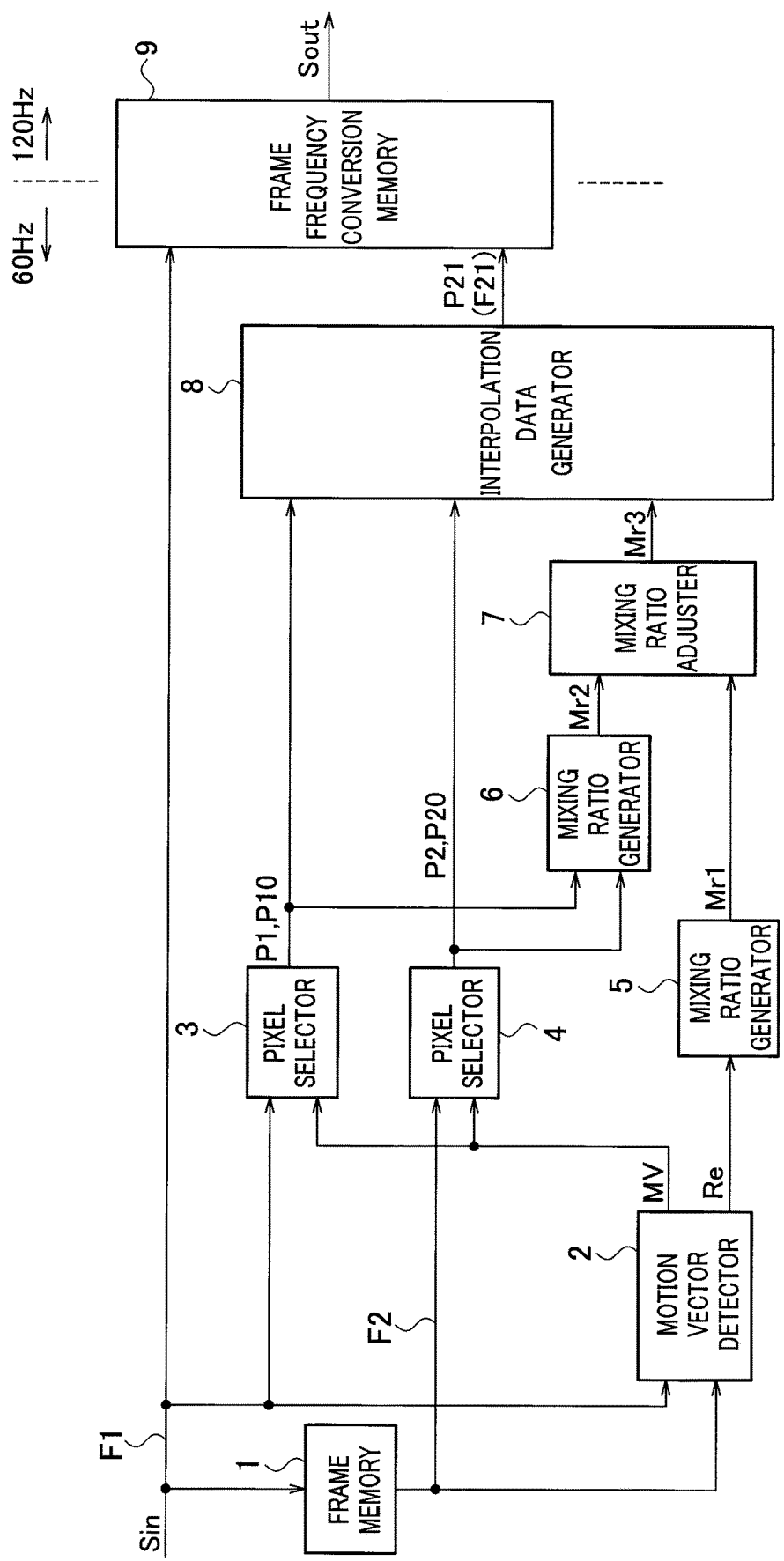
FIG. 1 is a block diagram illustrating a frame frequency conversion apparatus including an interpolation frame generation device according to one or more embodiments.

A description will be given below of an interpolation frame generation device according to one or more embodiments with reference to the accompanying drawings. A frame frequency conversion apparatus illustrated in FIG. 1 is composed by including the interpolation frame generation device according to one or more embodiments. Operations of the interpolation frame generation device will be described while describing operations of the frame frequency conversion apparatus.

In FIG. 1, pixels at respective pixel positions, which configure respective frames of a video signal Sin serving as a target of frame frequency conversion, are input to a frame memory 1, a motion vector detector 2, a pixel selector 3, and a frame frequency conversion memory 9 sequentially in units of one pixel. It is assumed that a frame of the input video signal Sin is a frame F1 that is a current frame. The frame F1 is an actual frame as a first frame. It is assumed that a frame frequency of the video signal Sin is 60 Hz.

The frame memory 1 delays the frame F1 by one frame period, and generates a frame F2 one frame before. The frame F2 is an actual frame as a second frame. Pixels at respective pixel positions, which configure the frame F2, are input to the motion vector detector 2 and the pixel selector 4 sequentially in units of one pixel.

From a predetermined range in the horizontal and vertical directions in the frame F1 and a predetermined range in the horizontal and vertical directions in the frame F2, the motion vector detector 2 extracts sets of pixels, which correspond to a variety of motions, and calculates difference values therebetween, and based on a direction in which the difference value is small, detects a motion vector MV. Note that, in respective block-interior pixels in a block composed of a plurality of pixels in the frame F1 and in a block composed of a plurality of pixels in the frame F2, the motion vector detector 2 can also calculate such difference values corresponding to a variety of motions, and can detect the motion vector MV based on a total sum of absolute values of the difference values.

The motion vector detector 2 may detect the motion vector MV with reference to pixels in frames other than the frames F1 and F2, for example, both of a future frame from the frame F1 and a past frame one frame before the frame F2, or either one thereof. In such a way, detection accuracy of the motion vector MV is improved. The frames to be mutually compared when the motion vector detector 2 detects the motion vector MV are not limited to two frames, and may be three frames or more. The motion vector detector 2 is not limited to the comparison between two frames adjacent to each other, and may compare frames separate from each other through interpolation of one or more frames.

In order to detect the motion vector MV in the blocks in the predetermined ranges in the horizontal and vertical directions between the frame F1 and the frame F2, the motion vector detector 2 includes pixel delayers (flip-flops) that delay input pixels in the horizontal direction and line memories that delay the input pixels in the vertical direction. The pixel delayers and the line memories may be provided outside the motion vector detector 2.

The motion vector detector 2 generates reliability data Re of the motion vector MV in addition to the detection of the motion vector MV. The motion vector detector 2 may treat, as the reliability data Re, the difference values between the pixels at the time of having detected the motion vector MV. The motion vector detector 2 generates such reliability data Re with higher reliability as the difference values are smaller and with lower reliability as the difference values are larger.

At the time of having detected the motion vector MV, the motion vector detector 2 may generate the reliability data Re based on a criterion as to how much difference a difference value of another candidate vector has from the difference value of the motion vector MV. In this case, the motion vector detector 2 generates the reliability data Re with higher reliability as the difference value of such another candidate vector is larger than the difference value of the motion vector MV.

The motion vector detector 2 only needs to generate the reliability data Re of the motion vector MV in a process of detecting the motion vector MV, and a specific generation method of the reliability data Re is not limited.

The motion vector MV is supplied to the pixel selectors 3 and 4, and the reliability data Re is supplied to a mixing ratio generator 5. Based on the reliability data Re, the mixing ratio generator 5 generates a first mixing ratio Mr1 in which interpolation pixels of dynamic interpolation and interpolation pixels of static interpolation are mixed with each other, which will be described later, and supplies the generated first mixing ratio Mr1 to a mixing ratio adjuster 7. The first mixing ratio Mr1 indicates a mixing ratio of both of the interpolation pixels of the dynamic interpolation and the interpolation pixels of the static interpolation when a sum of both thereof is defined as 1.

The pixel selector 3 selects a pixel P1 in the frame F1 based on the motion vector MV, and in addition, selects a pixel P10 located at the same pixel position as that of an interpolation pixel to be generated, and supplies the selected pixels P1 and P10 to the interpolation data generator 8. The pixel selector 4 selects a pixel P2 in the frame F2 based on the motion vector MV, and in addition, selects a pixel P20 located at the same pixel position as that of the interpolation pixel to be generated, and supplies the selected pixels P2 and P20 to the interpolation data generator 8.

The pixels P1 and P2 are a pair of pixels for the dynamic interpolation, and the pixels P10 and P20 are a pair of pixels for the static interpolation.

In order to select the pixels P1 and P2 in the frames F1 and F2 based on the motion vector MV, respectively and the pixels P10 and P20 located at the same pixel positions as those of the interpolation pixels to be generated, respectively, the pixel selectors 3 and 4 include pixel delayers which delay the input pixels in the horizontal direction and line memories which delay the input pixels in the vertical direction. Among the motion vector detector 2 and the pixel selectors 3 and 4, at least a part of the pixel delayers and the line memories may be shared. The pixel delayers and the line memories may be provided outside the pixel selectors 3 and 4.

Figure 2:
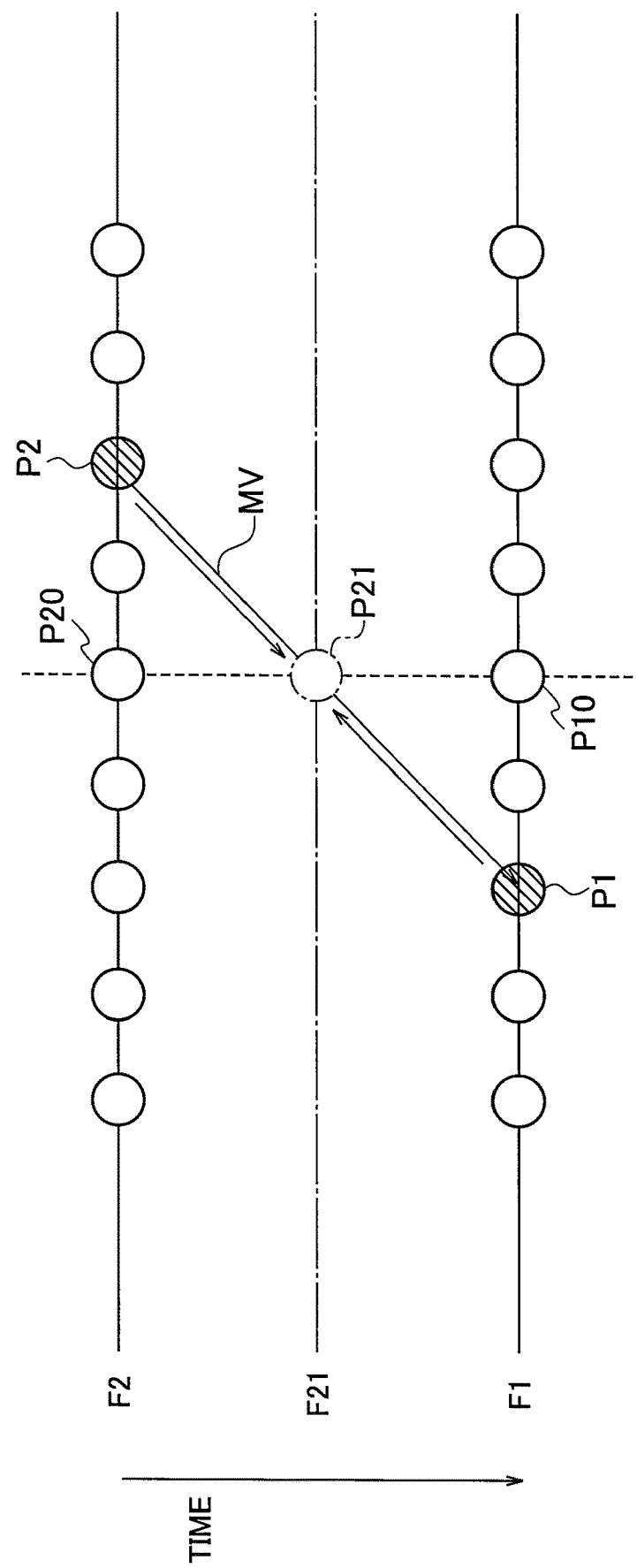
FIG. 2 is a view conceptually illustrating an operation of generating an interpolation pixel of dynamic interpolation by the interpolation frame generation device according to one or more embodiments.

FIG. 2 conceptually illustrates an operation in which the pixel selectors 3 and 4 select the pixels P1 and P2 based on the motion vector MV and generate an interpolation pixel P21 of an interpolation frame F21 interpolated between the frame F1 and the frame F2. Here, for simplification, only pixels in the horizontal direction are illustrated.

The motion vector MV indicates that an image has moved leftward in the horizontal direction by the amount of four pixels. At this time, if it is assumed to generate the interpolation pixel P21 by dynamic interpolation that is based on only the motion vector MV, then, the interpolation pixel P21 is generated in such a manner that the pixel P1 located at a position shifted leftward from the interpolation pixel P21 by two pixels and the pixel P2 located at a position shifted rightward by two pixels are added to each other and divided by two.

However, it is extremely difficult to detect a motion of an image without any erroneous detection, and the motion vector MV is not always completely correct. Accordingly, the pixel selectors 3 and 4 select the pixels P10 and P20 located at the same pixel position as that of the interpolation pixel P21 illustrated in FIG. 2, respectively, in addition to the pixels P1 and P2. As will be described later, the interpolation pixel P21 is sometimes generated based on the pixels P1 and P2 and the pixels P10 and P20.

Returning to FIG. 1, the pixel P1 selected by the pixel selector 3 and the pixel P2 selected by the pixel selector 4 are also supplied to a mixing ratio generator 6. Based on a difference value between the pixel P1 and the pixel P2, which are selected based on the motion vector MV, the mixing ratio generator 6 generates a second mixing ratio Mr2 in which the interpolation pixels of the dynamic interpolation and the interpolation pixels of the static interpolation are mixed with each other, and supplies the generated second mixing ratio Mr2 to the mixing ratio adjuster 7. The second mixing ratio Mr2 also indicates a mixing ratio of both of the interpolation pixels of the dynamic interpolation and the interpolation pixels of the static interpolation when the sum of both thereof is defined as 1.

The mixing ratio adjuster 7 generates a third mixing ratio Mr3, which is final, based on the first mixing ratio Mr1 and the second mixing ratio Mr2. As a first example, from between the first mixing ratio Mr1 and the second mixing ratio Mr2, the mixing ratio adjuster 7 selects a mixing ratio in which a ratio of the interpolation pixels of the static interpolation is larger, and defines the selected mixing ratio as the third mixing ratio Mr3.

For example, it is assumed that the first mixing ratio Mr1 indicates that the mixing ratio of the interpolation pixels of the dynamic interpolation and the interpolation pixels of the static interpolation is 0.7:0.3, and that the second mixing ratio MR2 indicates that the mixing ratio of the interpolation pixels of the dynamic interpolation and the interpolation pixels of the static interpolation is 0.6:0.4. At this time, the mixing ratio adjuster 7 adopts the second mixing ratio Mr2 as the third mixing ratio Mr3.

As a second example, the mixing ratio adjuster 7 averages the first mixing ratio and the second mixing ratio Mr2 to generate the third mixing ratio Mr3. For example, when the first mixing ratio indicates to be 0.7:0.3, and the second mixing ratio Mr2 indicates to be 0.6:0.4, the mixing ratio adjuster 7 averages both thereof to set the third mixing ratio Mr3 to 0.65:0.35.

If the first mixing ratio Mr1 and the second mixing ratio Mr2 are the same, the mixing ratio adjuster 7 adopts the mixing ratio of the interpolation pixels of the dynamic interpolation and the interpolation pixels of the static interpolation, the mixing ratio being indicated by the first mixing ratio Mr1 and the second mixing ratio Mr2, directly as the third mixing ratio Mr3.

If the first mixing ratio Mr1 and the second mixing ratio Mr2 are different from each other, the mixing ratio adjuster 7 only needs to generate such a third mixing ratio Mr3 in which the first mixing ratio Mr1 and the second mixing ratio Mr2 are adjusted so that the mixing ratio of the interpolation pixels of the static interpolation becomes larger than when the mixing ratio in which the mixing ratio of the interpolation pixels of the static interpolation is smaller is selected.

In the first example mentioned above, from between the first mixing ratio Mr1 and the second mixing ratio Mr2, the mixing ratio adjuster 7 only needs to select a mixing ratio in which the ratio of the interpolation pixels of the static interpolation is larger, and defines the selected mixing ratio as the third mixing ratio Mr3. Accordingly, a configuration in the first example is simplified more than in the second example, and therefore, the first example is preferable.

The mixing ratio adjuster 7 may generate the third mixing ratio Mr3 as follows as a third example. The mixing ratio generator 5 generates reliability of the first mixing ratio Mr1 based on the reliability data Re. A way of generating the reliability is not particularly limited; however, the mixing ratio generator 5 only needs to generate reliability that is higher as the reliability indicated by the reliability data Re is higher and lower as the reliability is lower. The mixing ratio generator 5 may directly adopt the reliability, which is indicated by the reliability data Re, as the reliability of the first mixing ratio Mr1.

The mixing ratio generator 6 generates reliability of the second mixing ratio Mr2 based on the difference value between the pixel P1 and the pixel P2. The mixing ratio generator 6 only needs to generate reliability that is higher as the difference value is smaller and lower as the difference value is larger.

From between the reliability of the first mixing ratio Mr1 generated by the mixing ratio generator 5 and the second mixing ratio Mr2 generated by the mixing ratio generator 6, the mixing ratio adjuster 7 adopts such a mixing ratio with higher reliability as the third mixing ratio Mr3.

The interpolation data generator 8 mixes such an interpolation pixel of the dynamic interpolation, which is generated based on the pixels P1 and P2, and such an interpolation pixel of the static interpolation, which is generated based on the pixels P10 and P20, adaptively with each other in response to the mixing ratio indicated by the third mixing ratio Mr3.

Figure 3:
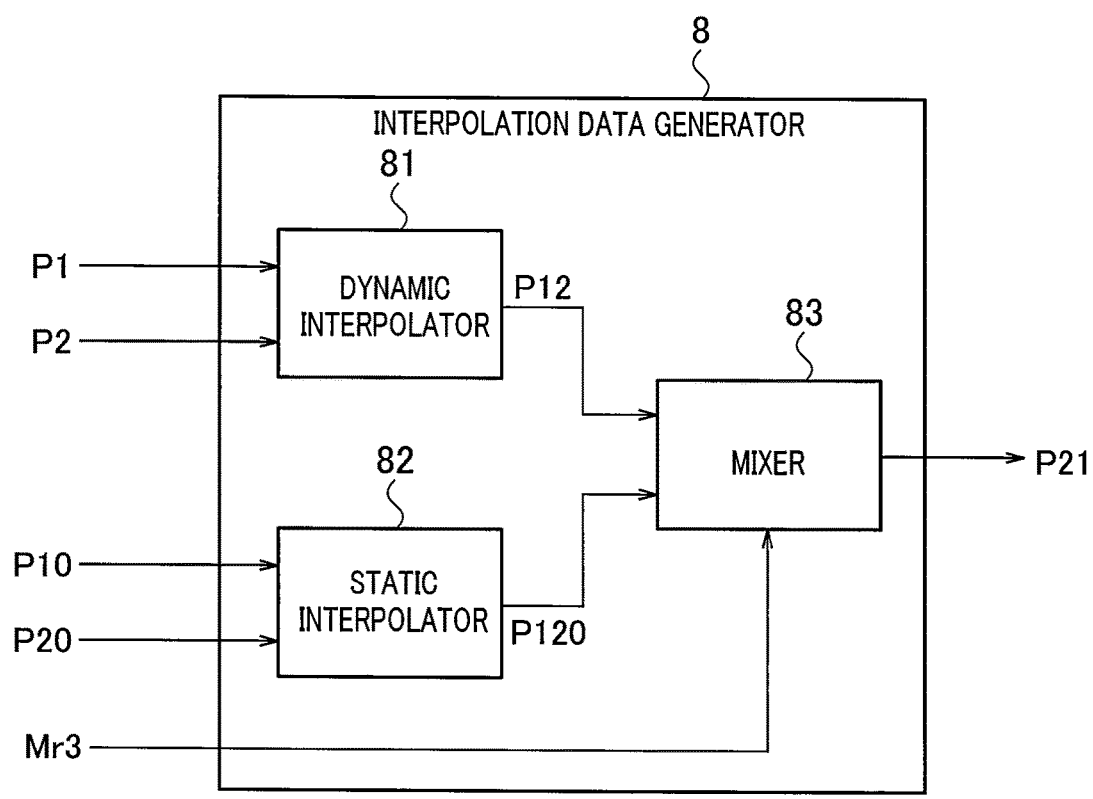
FIG. 3 is a block diagram illustrating an example of an internal configuration of an interpolation data generator 8 in FIG. 1.

As illustrated in FIG. 3, the interpolation data generator 8 includes a dynamic interpolator 81, a static interpolator 82, and a mixer 83. The dynamic interpolator 81 adds the pixel P1 and the pixel P2 to each other, divides an obtained sum by 2, and generates an interpolation pixel P12 of the dynamic interpolation. The static interpolator 82 adds the pixel P10 and the pixel P20 to each other, divides an obtained sum by 2, and generates an interpolation pixel P120 of the static interpolation. In response to the mixing ratio indicated by the third mixing ratio Mr3, the mixer 83 mixes the interpolation pixel P12 of the dynamic interpolation and the interpolation pixel P120 of the static interpolation adaptively with each other, and generates a final interpolation pixel P21.

Figure 4:
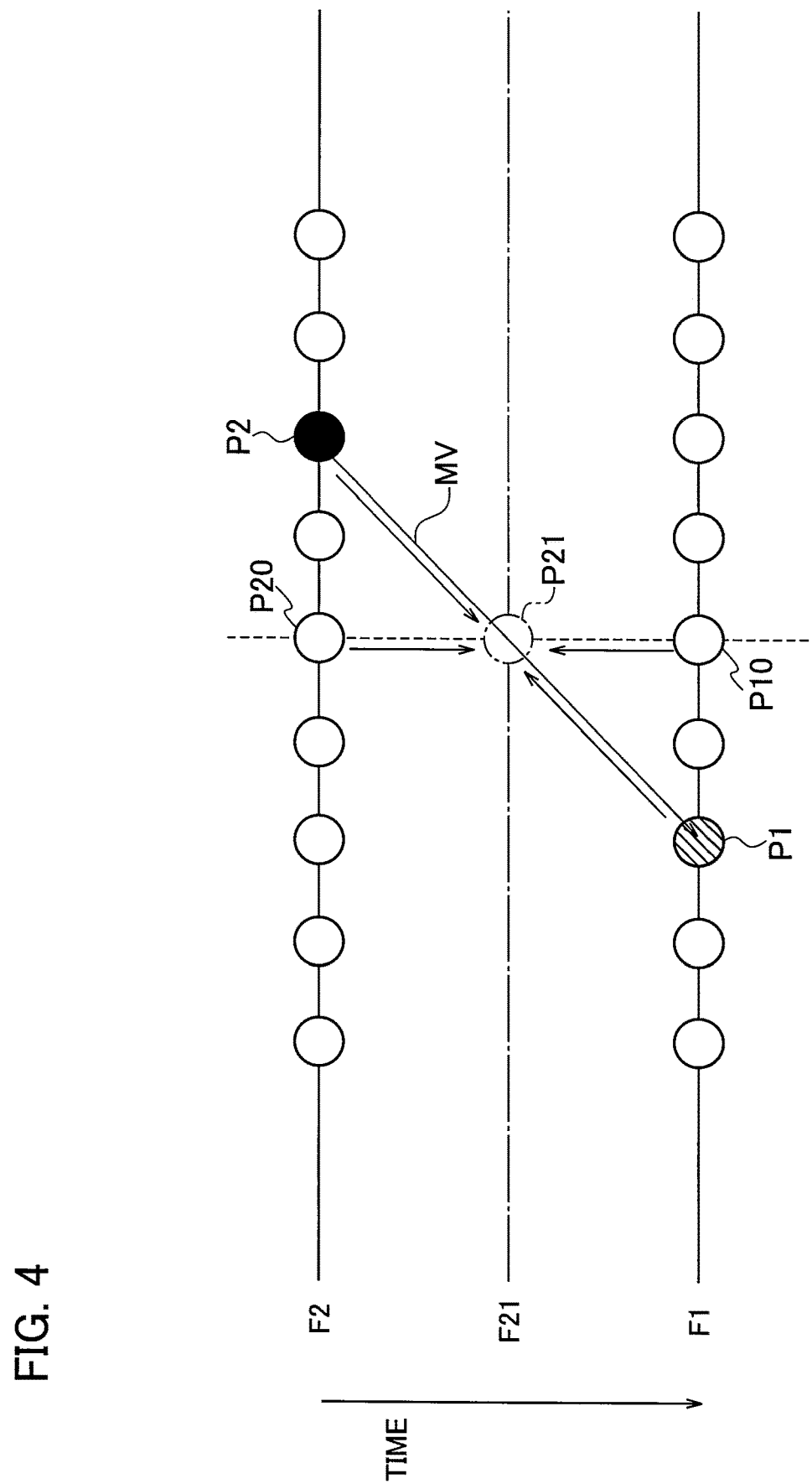
FIG. 4 is a view conceptually illustrating an operation of generating the interpolation pixel by mixing the interpolation pixel of the dynamic interpolation and an interpolation pixel of static interpolation with each other by the interpolation frame generation device according to one or more embodiments.

FIG. 4 illustrates a state of mixing the interpolation pixel P12 of the dynamic interpolation and the interpolation pixel P120 of the static interpolation adaptively with each other to generate the interpolation pixel P21. FIG. 2 corresponds to an operation of the interpolation data generator 8 when the third mixing ratio Mr3 indicates that the mixing ratio of the interpolation pixel of the dynamic interpolation and the interpolation pixel of the static interpolation is 1:0. The third mixing ratio Mr3 only needs to determine the mixing ratio of the interpolation pixel of the dynamic interpolation and the interpolation pixel of the static interpolation within a range of 1:0 to 0:1.

Returning to FIG. 1, the interpolation pixel P21 located at each position of the pixels which configure the interpolation frame F21 is supplied to the frame frequency conversion memory 9 sequentially in units of one pixel. The frame frequency conversion memory 9 writes the frame F1 and the interpolation frame F21. The frame frequency conversion memory 9 alternately reads out the frame F1 and the interpolation frame F21, which are thus written, at 120 Hz that is twice the frame frequency of the video signal Sin, thereby generating and outputting a video signal Sout at a frame frequency 120 Hz.

As described above, in accordance with the interpolation frame generation device according to one or more embodiments, the interpolation frame F21 can be generated while reducing the feeling of visual discomfort when the motion vector MV is erroneously detected, and without losing the smoothness of the motion of the image more than necessary. In accordance with the frame frequency conversion apparatus including the interpolation frame generation device according to one or more embodiments, there can be generated the video signal Sout in which the frequency is converted, the video signal Sout having a reduced feeling of visual discomfort when the motion vector MV is erroneously detected, and allowing the smoothness of the motion of the image not to be lost more than necessary.

The interpolation frame generation device may be an interpolation frame generation device that is used for a frame frequency conversion apparatus that converts a frame frequency to be four times and generates three interpolation frames between two actual frames adjacent to each other.

The respective units of FIG. 1 may be composed of a hardware circuit, or at least a part thereof may be composed of software (a computer program). Choice of the hardware and the software is arbitrary. The computer program may be stored and provided in a non-transitory storage medium.

It should be noted that, besides those already described, varieties of modifications and alterations may be added to the above-described one or more embodiments without deviating from novel and advantageous features of the present invention. Hence, the entire modifications and alterations as described above are intended to be incorporated in the accompanying scope of claims.

What is claimed is:

1. An interpolation frame generation device comprising:
   a motion vector detector configured to detect a motion vector of an image based on pixels in at least first and second frames in an input video signal, and to generate reliability data indicating reliability of the motion vector;
   a pixel selector configured to select a pair of pixels for dynamic interpolation based on the motion vector and a pair of pixels for static interpolation from the pixels in the first and second frames in order to generate respective interpolation pixels which configure an interpolation frame to be interpolated between the first and second frames;
   a first mixing ratio generator configured, based on the reliability data, to generate a first mixing ratio indicating a mixing ratio of the interpolation pixels of the dynamic interpolation, the interpolation pixels being generated based on the pair of pixels for the dynamic interpolation, and the interpolation pixels of the static interpolation, the interpolation pixels being generated based on the pair of pixels for the static interpolation;
   a second mixing ratio generator configured to generate a second mixing ratio indicating a mixing ratio of the interpolation pixels of the dynamic interpolation and the interpolation pixels of the static interpolation based on a difference value between the pair of pixels for the dynamic interpolation, the pixels being selected by the pixel selector;
   a mixing ratio adjuster configured, when the first mixing ratio and the second mixing ratio are different from each other, to generate a third mixing ratio by adjusting the first mixing ratio and the second mixing ratio so that the mixing ratio of the interpolation pixels of the static interpolation becomes larger than when a mixing ratio in which the mixing ratio of the interpolation pixels of the static interpolation is smaller is selected from between the first mixing ratio and the second mixing ratio; and
   an interpolation data generator configured to generate the interpolation pixels of the dynamic interpolation and the interpolation pixels of the static interpolation, and to mix the interpolation pixels of the dynamic interpolation and the interpolation pixels of the static interpolation adaptively with each other in response to the third mixing ratio to generate interpolation pixels.

2. The interpolation frame generation device according to claim 1, wherein the mixing ratio adjuster adopts, as the third mixing ratio, a mixing ratio in which a ratio of the interpolation pixels of the static interpolation is larger between the first mixing ratio and the second mixing ratio.

3. The interpolation frame generation device according to claim 1, wherein the mixing ratio adjuster averages the first mixing ratio and the second mixing ratio to generate the third mixing ratio.

* * * * *